(12) United States Patent
Shimokawa et al.

(10) Patent No.: US 11,342,802 B2
(45) Date of Patent: May 24, 2022

(54) CONSEQUENT-POLE TYPE ROTOR, ELECTRIC MOTOR, COMPRESSOR, BLOWER, AND AIR CONDITIONER

(71) Applicant: Mitsubishi Electric Corporation, Tokyo (JP)

(72) Inventors: Takaya Shimokawa, Tokyo (JP); Hiroki Aso, Tokyo (JP); Takanori Watanabe, Tokyo (JP); Ryogo Takahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 60 days.

(21) Appl. No.: 16/638,795

(22) PCT Filed: Sep. 5, 2017

(86) PCT No.: PCT/JP2017/031932
§ 371 (c)(1),
(2) Date: Feb. 13, 2020

(87) PCT Pub. No.: WO2019/049203
PCT Pub. Date: Mar. 14, 2019

(65) Prior Publication Data
US 2021/0135520 A1    May 6, 2021

(51) Int. Cl.
*H02K 1/27* (2022.01)
*H02K 1/2746* (2022.01)
(Continued)

(52) U.S. Cl.
CPC ......... *H02K 1/2746* (2013.01); *F24F 1/0018* (2013.01); *F24F 13/24* (2013.01);
(Continued)

(58) Field of Classification Search
CPC ........ F24F 1/0018; F24F 13/24; H02K 1/246; H02K 1/276; H02K 2213/03
(Continued)

(56) References Cited

U.S. PATENT DOCUMENTS 4,038,061 A * 7/1977 Anderson ............... F25B 49/02
62/126
5,672,926 A    9/1997 Brandes et al.
(Continued)

FOREIGN PATENT DOCUMENTS

EP    0 729 217 A2    8/1996
JP    H08-182267 A    7/1996
(Continued)

OTHER PUBLICATIONS

Office Action dated Feb. 11, 2021 issued in corresponding to Australian patent application No. 2017431234.
(Continued)

*Primary Examiner* — Terrance L Kenerly
(74) *Attorney, Agent, or Firm* — Posz Law Group, PLC

(57) ABSTRACT

A rotor includes a rotor core including a magnet insertion hole and an opening and a permanent magnet inserted in the magnet insertion hole and forming a first magnetic pole. The rotor satisfies L1<L2, where L1 is a first maximum width of the opening in a direction perpendicular to a radial direction and L2 is a second maximum width of the opening in the radial direction. A distance from the opening to the magnet insertion hole is smallest at a magnetic pole center of the first magnetic pole.

18 Claims, 7 Drawing Sheets

(51) Int. Cl.
  *F24F 1/0018* (2019.01)
  *F24F 13/24* (2006.01)
  *F25B 31/02* (2006.01)
  *H02K 1/24* (2006.01)
  *H02K 1/276* (2022.01)

(52) U.S. Cl.
  CPC ............ *F25B 31/02* (2013.01); *H02K 1/246* (2013.01); *H02K 1/276* (2013.01); *H02K 2213/03* (2013.01)

(58) Field of Classification Search
  USPC .......................... 310/156.53, 156.56, 156.83
  See application file for complete search history.

(56) References Cited

U.S. PATENT DOCUMENTS

| | | | | |
|---|---|---|---|---|
| 5,731,647 | A | * | 3/1998 | Schuller ............... H02K 21/046 310/114 |
| 2014/0117792 | A1 | | 5/2014 | Naitou |
| 2016/0181877 | A1 | | 6/2016 | Ishikawa et al. |
| 2018/0219438 | A1 | | 8/2018 | Oikawa et al. |
| 2019/0036399 | A1 | | 1/2019 | Yamada et al. |

FOREIGN PATENT DOCUMENTS

| | | | |
|---|---|---|---|
| JP | H08-251849 A | | 9/1996 |
| JP | H08-251891 A | | 9/1996 |
| JP | 2012016130 | * | 1/2012 ............... H02K 1/27 |
| JP | 2014-090577 A | | 5/2014 |
| JP | 5491298 B2 | | 5/2014 |
| JP | 2016226218 | * | 12/2016 |
| WO | 2017/014207 A1 | | 1/2017 |
| WO | 2017/085814 A1 | | 5/2017 |

OTHER PUBLICATIONS

Office Action dated Feb. 17, 2021 issued in corresponding to Indian patent application No. 202027007337.
Extended European Search Report dated Jul. 27, 2020 issued in corresponding EP patent application No. 17924439.7.
Office Action dated Mar. 22, 2021, issued in corresponding European Patent Application No. 17924439.7.
Office Action dated Apr. 28, 2021, issued in corresponding Australian Patent Application No. 2017431234.
Office Action dated Aug. 10, 2021, issued in corresponding Korean Patent Application No. 10-2020-7004263 (and English Machine Translation).
Office Action dated Jun. 3, 2021, issued in corresponding Chinese Patent Application No. 201780094044.7 ( and English translation).
Office Action dated Mar. 1, 2022, issued in corresponding Chinese Patent Application No. 201780094044.7 (and English Machine Translation).

* cited by examiner

CONSEQUENT-POLE TYPE ROTOR, ELECTRIC MOTOR, COMPRESSOR, BLOWER, AND AIR CONDITIONER

CROSS REFERENCE TO RELATED APPLICATION

This application is a U.S. national stage application of International Patent Application No. PCT/JP2017/031932 filed on Sep. 5, 2017, the disclosure of which is incorporated herein by reference.

TECHNICAL FIELD

The present invention relates to a rotor used for an electric motor, and in particular, to a consequent-pole type rotor.

BACKGROUND

Consequent-pole type rotors are being used as rotors of electric motors. The consequent-pole type rotor is divided into regions each including a permanent magnet and regions including no permanent magnet. For example, a region including a permanent magnet functions as one magnetic pole (e.g., a magnetic pole functioning as a north pole for a stator), and a region between permanent magnets adjacent to each other in a circumferential direction functions as the other magnetic pole (e.g., a pseudo-magnetic pole functioning as a south pole for the stator) (see Patent Reference 1, for example).

PATENT REFERENCE

Patent Reference 1: Japanese Patent Application Publication No. 8-182267

However, in the conventional technology, magnetic flux flowing from the stator to a pseudo-magnetic pole of the consequent-pole type rotor is prone to pass through an adjacent and different magnetic pole in the circumferential direction.

Accordingly, a problem arises in that noise in the motor increases.

SUMMARY

An object of the present invention is to reduce the noise in an electric motor.

A consequent-pole type rotor according to an aspect of the present invention is a consequent-pole type rotor including a first magnetic pole and a second magnetic pole, including: a rotor core including a magnet insertion hole and an opening formed inside the magnet insertion hole in a radial direction; and a permanent magnet inserted in the magnet insertion hole and forming the first magnetic pole. The consequent-pole type rotor satisfies L1<L2, where L1 is a first maximum width of the opening in a direction perpendicular to the radial direction and L2 is a second maximum width of the opening in the radial direction. A distance from the opening to the magnet insertion hole is smallest at a magnetic pole center of the first magnetic pole.

A consequent-pole type rotor according to an another aspect of the present invention is a consequent-pole type rotor including a first magnetic pole and a second magnetic pole, including: a rotor core including a magnet insertion hole and a plurality of openings formed inside the magnet insertion hole in a radial direction; and a permanent magnet inserted in the magnet insertion hole. The rotor core is divided into a first region and a second region adjacent to the first region. The first region includes the magnet insertion hole and the plurality of openings and forms the first magnetic pole. The second region forms the second magnetic pole. The plurality of openings are formed in the first region. A shortest distance from a first opening of the plurality of openings to the magnet insertion hole and a shortest distance from a second opening of the plurality of openings to the magnet insertion hole are different from each other. A maximum width of the first opening in the radial direction is greater than a maximum width of the first opening in a direction perpendicular to the radial direction.

According to the present invention, noise in an electric motor can be reduced.

DETAILED DESCRIPTION

First Embodiment

An electric motor 1 according to a first embodiment of the present invention will be described below.

In an xyz orthogonal coordinate system shown in each drawing, a z-axis direction (z-axis) represents a direction parallel to an axis line A1 of a shaft 23 of the electric motor 1 (hereinafter referred to as an "axial direction"), an x-axis direction (x-axis) represents a direction perpendicular to the z-axis direction (z-axis), and a y-axis direction represents a direction perpendicular to both the z-axis direction and the x-axis direction.

Figure 1:
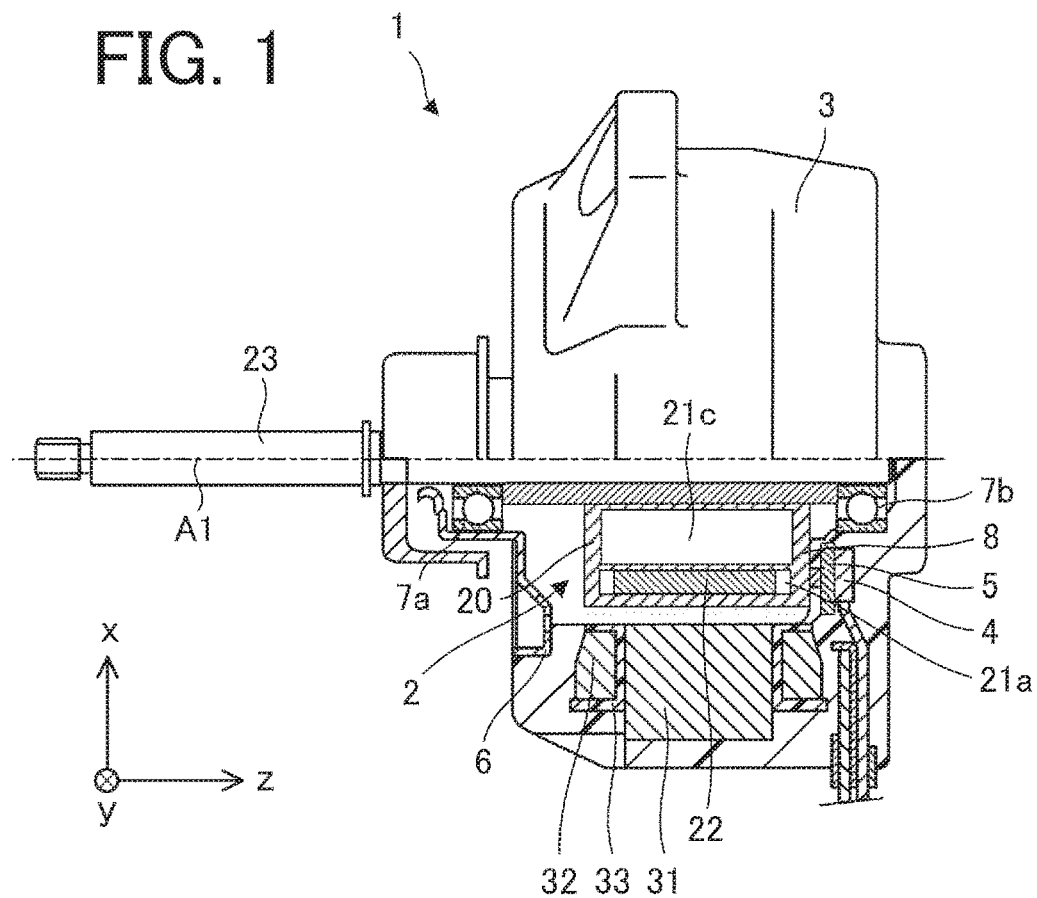
FIG. 1 is a partially sectional view schematically showing a structure of an electric motor according to a first embodiment of the present invention.

FIG. 1 is a partially sectional view schematically showing a structure of the electric motor 1 according to the first embodiment of the present invention.

Figure 2:
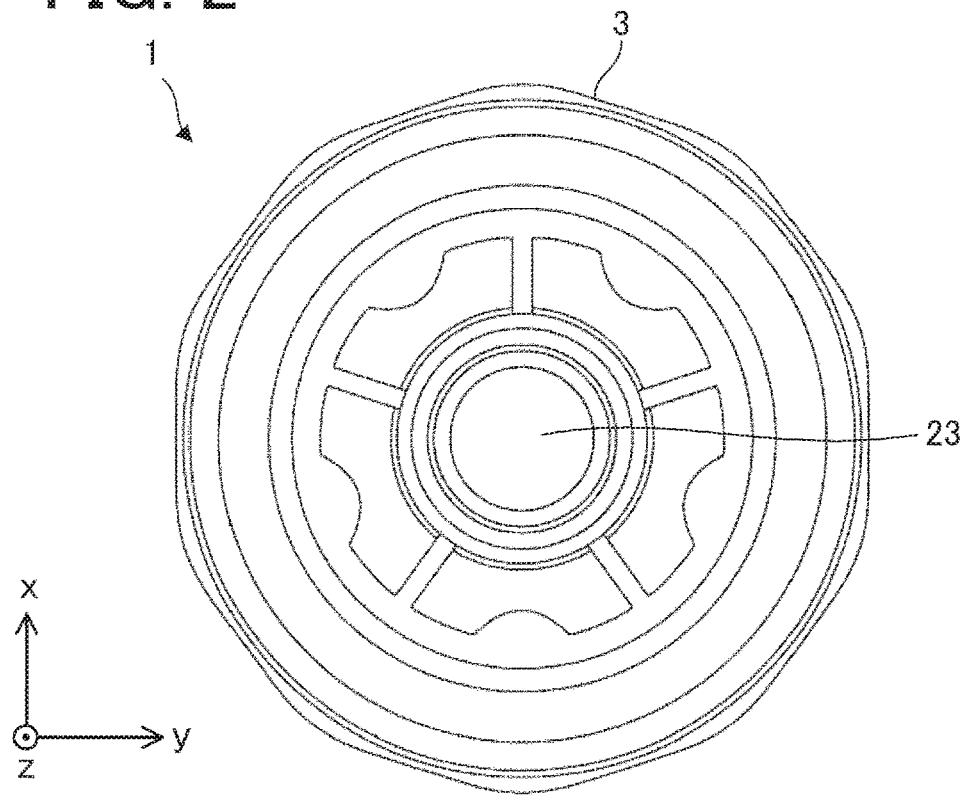
FIG. 2 is a front view schematically showing the structure of the electric motor.

FIG. 2 is a front view schematically showing the structure of the electric motor 1.

The electric motor 1 includes a rotor 2, a stator 3, a circuit board 4, a magnetic sensor 5 that detects a rotational position of the rotor 2, a bracket 6, bearings 7a and 7b, and a sensor magnet 8 as a magnet for detecting the position of the rotor 2. The electric motor 1 is a permanent magnet synchronous motor, for example.

The circuit board 4 is provided on a side of the stator 3 at one end in the axial direction. Electronic components such as a control circuit and the magnetic sensor 5 are attached to the circuit board 4. The magnetic sensor 5 detects the rotational position of the rotor 2 by detecting a rotational position of the sensor magnet 8. The sensor magnet 8 is attached to the rotor 2 to face the magnetic sensor 5. The sensor magnet 8 is disk-shaped, for example. The sensor magnet 8 rotates together with the rotor 2.

Figure 3:
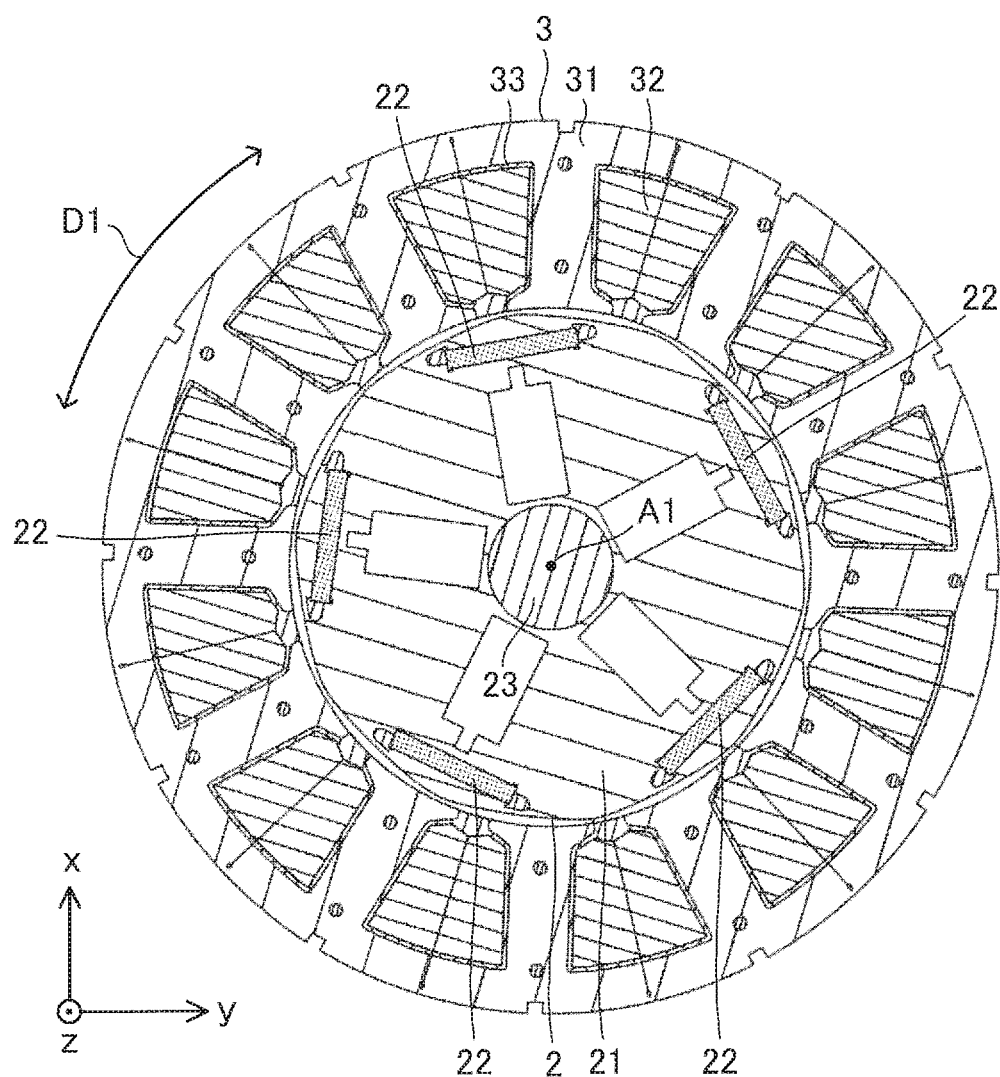
FIG. 3 is a cross-sectional view schematically showing a structure of a rotor and a stator.

FIG. 3 is a cross-sectional view schematically showing a structure of the rotor 2 and the stator 3. The arrow D1 shows a circumferential direction of a rotor core 21, the rotor 2 and the stator 3 (hereinafter referred to simply as "the circumferential direction"). Namely, the arrow D1 shows a direction along an outer circumference of the rotor core 21 and the rotor 2.

The stator 3 includes a stator core 31, a coil 32 and an insulator 33.

The stator core 31 is formed by, for example, stacking a plurality of electromagnetic steel sheets. The thickness of each electromagnetic steel sheet is 0.2 mm to 0.5 mm, for example. The stator core 31 is formed in a ring-like shape.

The coil 32 is formed by, for example, winging a winding (e.g., magnet wire) around tooth parts of the stator core 31 via the insulator 33. The coil 32 (i.e., winding) is formed of material including copper or aluminum, for example. The coil 32 is insulated by the insulator 33.

The insulator 33 is formed of resin having an insulating property, such as polybutylene terephthalate (PBT), polyphenylene sulfide (PPS), liquid crystal polymer (LCP) or polyethylene terephthalate (PET). The insulator 33 formed of resin is a film having a thickness of 0.035 mm to 0.4 mm, for example.

For example, the insulator 33 is formed integrally with the stator core 31. However, the insulator 33 may also be formed separately from the stator core 31. In this case, after the insulator 33 is formed, the formed insulator 33 is fit in the stator core 31.

In this embodiment, the stator core 31, the coil 32 and the insulator 33 are covered by thermosetting resin (e.g., bulk molding compound (BMC)) such as unsaturated polyester resin. The stator core 31, the coil 32 and the insulator 33 may be fixed by a cylindrical shell formed of material containing iron, for example. In this case, the cylindrical shell is capable of covering the stator 3 together with the rotor 2 by means of shrink fitting.

The rotor 2 is arranged inside the stator 3 via an air gap. The bracket 6 is pressed into an opening on a load side of the stator 3 (load side of the electric motor 1). The bearing 7a into which the shaft 23 has been inserted is fixed on the load side of the stator 3. Similarly, the bearing 7b into which the shaft 23 has been inserted is fixed on an anti-load side of the stator 3. The rotor 2 is supported by the bearings 7a and 7b to be rotatable.

The sensor magnet 8 detects the rotational position of the rotor 2. The sensor magnet 8 is fixed to a side of the rotor 2 at one end in the axial direction to face the magnetic sensor 5.

The sensor magnet 8 has been magnetized in the axial direction so that its magnetic flux flows into the magnetic sensor 5. Accordingly, the magnetic sensor 5 can be attached to a side of the stator 3 at one end in the axial direction to face the sensor magnet 8. However, the direction of the magnetic flux from the sensor magnet 8 is not limited to the axial direction.

The number of magnetic poles of the sensor magnet 8 is the same as the number of magnetic poles of the rotor 2. The sensor magnet 8 is positioned so that the polarity of the sensor magnet 8 coincides with the polarity of the rotor 2 in regard to the circumferential direction.

The magnetic sensor 5 detects the rotational position of the rotor 2 by detecting the rotational position of the sensor magnet 8. For example, a Hall IC, an MR (magnetoresistance) element, a GMR (giant magnetoresistance) element, a magneto-impedance element, or the like is used for the magnetic sensor 5. The magnetic sensor 5 is fixed at a position where magnetic flux emitted from the sensor magnet 8 flows (detection position).

The control circuit attached to the circuit board 4 controls the rotation of the rotor 2 by controlling electric current flowing through the coil 32 of the stator 3 by using the result of the detection by the magnetic sensor 5 (e.g., magnetic pole switching point as a boundary between a north pole and a south pole of the sensor magnet 8).

The magnetic sensor 5 detects the positions (phases) of the magnetic poles of the sensor magnet 8 and the rotor 2 based on the change in the magnetic field flowing into the magnetic sensor 5 (magnetic field intensity). Specifically, the magnetic sensor 5 determines timing at which the direction of the magnetic field changes in the circumferential direction (rotation direction) of the sensor magnet 8 (specifically, the magnetic pole switching points of the sensor magnet 8) by detecting magnetic flux from a north pole of the sensor magnet 8 and magnetic flux heading towards a south pole of the sensor magnet 8. Since the sensor magnet 8 has north poles and south poles alternately arranged in the circumferential direction, the positions of the magnetic poles in the rotation direction (the rotation angle and the phase of the rotor 2) can be grasped by the periodical detection of the magnetic pole switching points of the sensor magnet 8 by the magnetic sensor 5.

Figure 4:
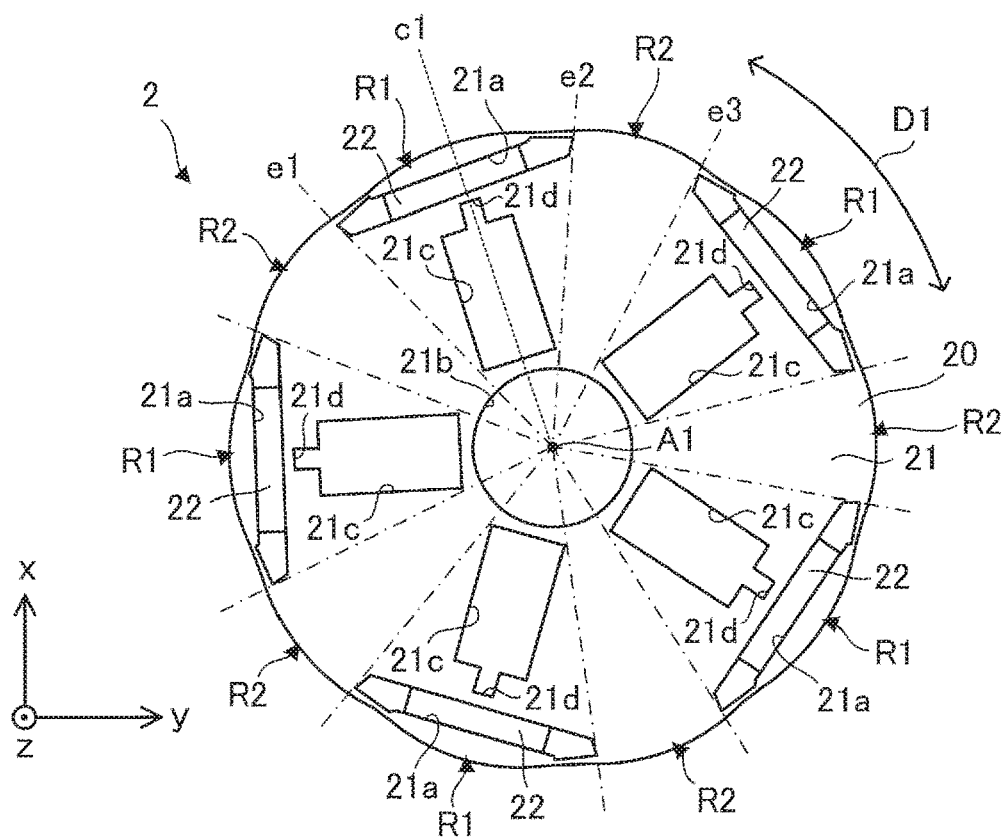
FIG. 4 is a plan view schematically showing the structure of the rotor.

FIG. 4 is a plan view schematically showing a structure of the rotor 2.

Figure 5:
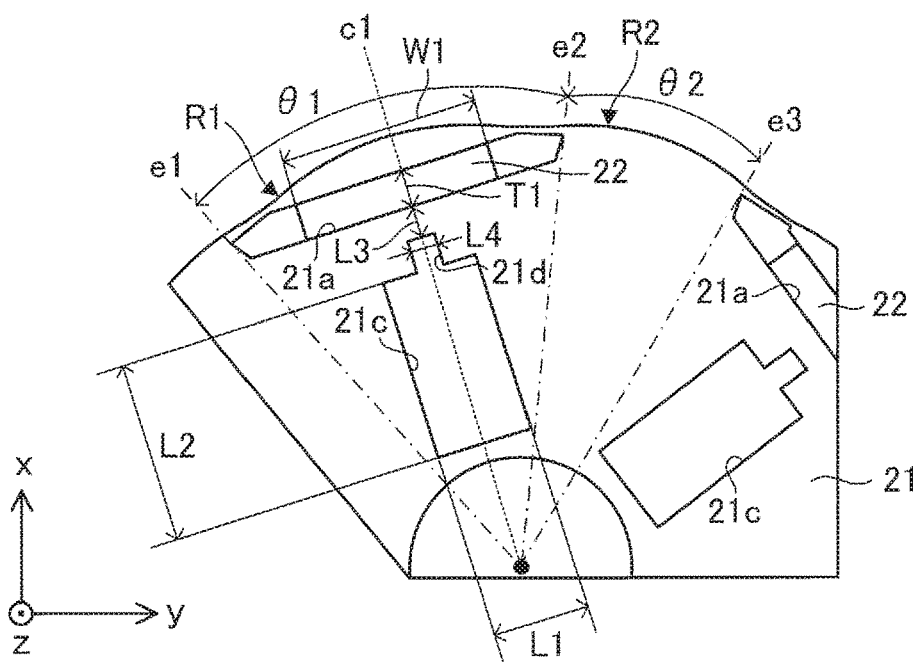
FIG. 5 is an enlarged view showing a structure of a part of the rotor shown in FIG. 4.

FIG. 5 is an enlarged view showing a structure of a part of the rotor 2 shown in FIG. 4.

The rotor 2 includes the rotor core 21 as a main magnet part, at least one permanent magnet 22, and the shaft 23. The axis of rotation of the rotor 2 coincides with the axis line A1. The rotor 2 is a permanent magnet embedded rotor, for example. In this embodiment, the rotor 2 is a consequent-pole type rotor.

The rotor 2 of the consequent-pole type includes a first magnetic pole having a first polarity and a second magnetic pole having a second polarity different from the first polarity. In this embodiment, the first magnetic pole is a north pole and the second magnetic pole is a south pole.

In the rotor 2, a region including a permanent magnet 22 (a first region R1 which will be described later) functions as one magnetic pole (e.g., a magnetic pole functioning as a north pole for the stator) and a region between permanent magnets 22 adjacent to each other in the circumferential direction (a second region R2 which will be described later) functions as a magnetic pole on the other side (e.g., a pseudo-magnetic pole functioning as a south pole for the stator).

The rotor core 21 includes at least one magnet insertion hole 21a, a rotary shaft insertion hole 21b, and at least one opening 21c. In this embodiment, the rotor core 21 includes a plurality of magnet insertion holes 21a, and at least one permanent magnet 22 is inserted in each magnet insertion hole 21a.

In this embodiment, the number of the permanent magnets 22 is half of the number n of the magnetic poles of the rotor 2 (n is an even number larger than or equal to 4). The number n of the magnetic poles of the rotor 2 is the sum total of the number of magnetic poles functioning as north poles for the stator 3 and the number of magnetic poles functioning as south poles for the stator 3.

The rotor core 21 may include a bridge part as a part (specifically, a thin-wall part) of a thin plate (e.g., electromagnetic steel sheets) formed between the magnet insertion hole 21a and an outer surface (outer edge) of the rotor 2. This bridge part inhibits occurrence of leakage flux.

However, the electric motor 1 may also be an SPM (Surface Permanent Magnet) motor. In this case, no magnet insertion hole 21a is formed in the rotor core 21 and the permanent magnet 22 is attached to the outer surface of the rotor core 21 in regard to a radial direction.

The rotor core 21 is formed with a plurality of electromagnetic steel sheets. Each electromagnetic steel sheet has a thickness of 0.2 mm to 0.5 mm, for example. The electromagnetic steel sheets are stacked in the axial direction. However, the rotor core 21 may also be configured as a resin core formed by mixing soft magnetic material and resin together instead of using a plurality of electromagnetic steel sheets.

A plurality of magnet insertion holes 21a are formed at even intervals in the circumferential direction of the rotor core 21. In this embodiment, five magnet insertion holes 21a are formed in the rotor core 21. Each magnet insertion hole 21a penetrates the rotor core 21 in the axial direction.

The rotary shaft insertion hole 21b is formed in a central part of the rotor core 21. The rotary shaft insertion hole 21b penetrates the rotor core 21 in the axial direction. The shaft 23 is inserted in the rotary shaft insertion hole 21b.

The shaft 23 is integrated with the rotor core 21 by caulking or by using thermoplastic resin such as PBT. The shape of the thermoplastic resin is adjusted appropriately depending on the purpose of the electric motor 1. In this case, the thermoplastic resin being non-magnetic material is poured into the rotary shaft insertion hole 21b. With this configuration, magnetic flux flowing from the stator 3 into the second region R2 can be prevented from flowing into the shaft 23 and advantages of the opening 21c which will be described later can be obtained adequately.

A permanent magnet 22 is inserted in each magnet insertion hole 21a. In the magnet insertion hole 21a, parts around the permanent magnet 22 are filled in with resin, by which the permanent magnet 22 is fixed in the magnet insertion hole 21a. However, it is also possible to fix the permanent magnet 22 by a method other than the fixation method using resin. The permanent magnet 22 is, for example, a rare-earth magnet containing neodymium or samarium. The permanent magnet 22 may also be ferrite magnet containing iron. The type of the permanent magnet 22 is not limited to the examples in this embodiment; the permanent magnet 22 may also be formed of different material.

The permanent magnet 22 in the magnet insertion hole 21a has been magnetized in the radial direction, and accordingly, magnetic flux from the rotor 2 flows into the stator 3. The permanent magnet 22 forms a north pole of the rotor 2 (specifically, a north pole functioning for the stator 3). Further, the permanent magnet 22 (specifically, magnetic flux from the permanent magnet 22) forms a south pole as a pseudo-magnetic pole of the rotor 2 (specifically, a south pole functioning for the stator 3) in the second region R2 which will be described later.

The rotor core 21 is divided into the first regions R1 and the second regions R2. In the example shown in FIG. 4 and FIG. 5, each first region R1 is a region between a straight line e1 (first straight line) and a straight line e2 (second straight line) on a plane perpendicular to the axial direction (hereinafter referred to as an "xy plane"), and each second region R2 is a region between the straight line e2 and a straight line e3 on the xy plane.

The straight lines e1, e2 and e3 are boundary lines between a first region R1 and a second region R2 on the xy plane. In the example shown in FIG. 5, the straight lines e1 and e2 define a first region R1 on the xy plane and the straight lines e2 and e3 define a second region R2 on the xy plane.

The first region R1 is a region including a magnet insertion hole 21a and an opening 21c. Thus, the first region R1 forms a north pole functioning for the stator 3.

The second region R2 is a region adjacent to a first region R1. Namely, the second region R2 is a region including no magnet insertion hole 21a. The second region R2 forms a south pole functioning for the stator 3.

The opening 21c is formed inside the magnet insertion hole 21a in the radial direction. To maintain sufficient rigidity of the rotor core 21, the opening 21c is desired not to be connected with the magnet insertion hole 21a or the rotary shaft insertion hole 21b.

In each opening 21c, a width L1 of the opening 21c is less than a width L2 of the opening 21c. Put another way, the width L2 is greater than the width L1. The width L1 is a maximum width of the opening 21c in a direction perpendicular to the radial direction (first maximum width). The width L2 is a maximum width of the opening 21c in the radial direction (second maximum width).

In the first region R1, the relationship between the width L1 of the opening 21c and a width T1 of the magnet insertion hole 21a satisfies 1.5<L1/T1. Further, the rotor 2 is desired to satisfy L1/T1<7.5. In this embodiment, the width T1 is the width (maximum width) of the magnet insertion hole 21a in the radial direction, that is, the width on a magnetic pole center c1.

In the opening 21c, a projecting part 21d as a part of an outer end part in the radial direction projects outward in the radial direction. The projecting part 21d of the opening 21c coincides with the magnetic pole center c1 on the xy plane. Therefore, a distance L3 from the opening 21c to the magnet insertion hole 21a is the smallest at the magnetic pole center c1 of the north pole. The distance L3 is the width of a connection part, as a part of the rotor core 21 formed between the opening 21c and the magnet insertion hole 21a, in the radial direction. Specifically, the distance L3 is a shortest distance from the projecting part 21d to the magnet insertion hole 21a.

In the first region R1, the relationship between a width L4 of the opening 21c and a width W1 of the permanent magnet 22 satisfies 0<L4/W1<0.2. The width L4 is the width (maximum width) of the outer end part of the opening 21c in the radial direction (specifically, the projecting part 21d) measured in the direction perpendicular to the radial direction. The width W1 is the width (maximum width) of the permanent magnet 22 in the direction perpendicular to the radial direction. The width W1 of the permanent magnet 22 is less than the width of the magnet insertion hole 21a in the direction perpendicular to the radial direction by approximately 0.1 mm to 0.5 mm, for example. The width T1 of the permanent magnet 22 is less than the width of the magnet insertion hole 21a in the radial direction by approximately 0.1 mm to 0.5 mm, for example. In this case, the width W1 of the permanent magnet 22 is desired to satisfy W1>5×T1.

As shown in FIG. 5, the angle formed by the straight line e1 and the straight line e2 on the xy plane is an angle θ1 (first angle), and the angle formed by the straight line e2 and the straight line e3 on the xy plane is an angle θ2 (second angle). In this case, the rotor 2 (specifically, the rotor core 21) satisfies (θ1+θ2)×n (n is an integer greater than or equal to 4)/2=360 degrees. Here, n is the total number of the first regions R1 (specifically, the number of the first regions R1 in the rotor core 21) and the second regions R2 (specifically, the number of the second regions R2 in the rotor core 21).

In this embodiment, the total number of the first regions R1 (the number of the first regions R1 is 5) and the second regions R2 (the number of the second regions R2 is 5) is 10.

Advantages of the rotor 2 will be described below.

Figure 6:
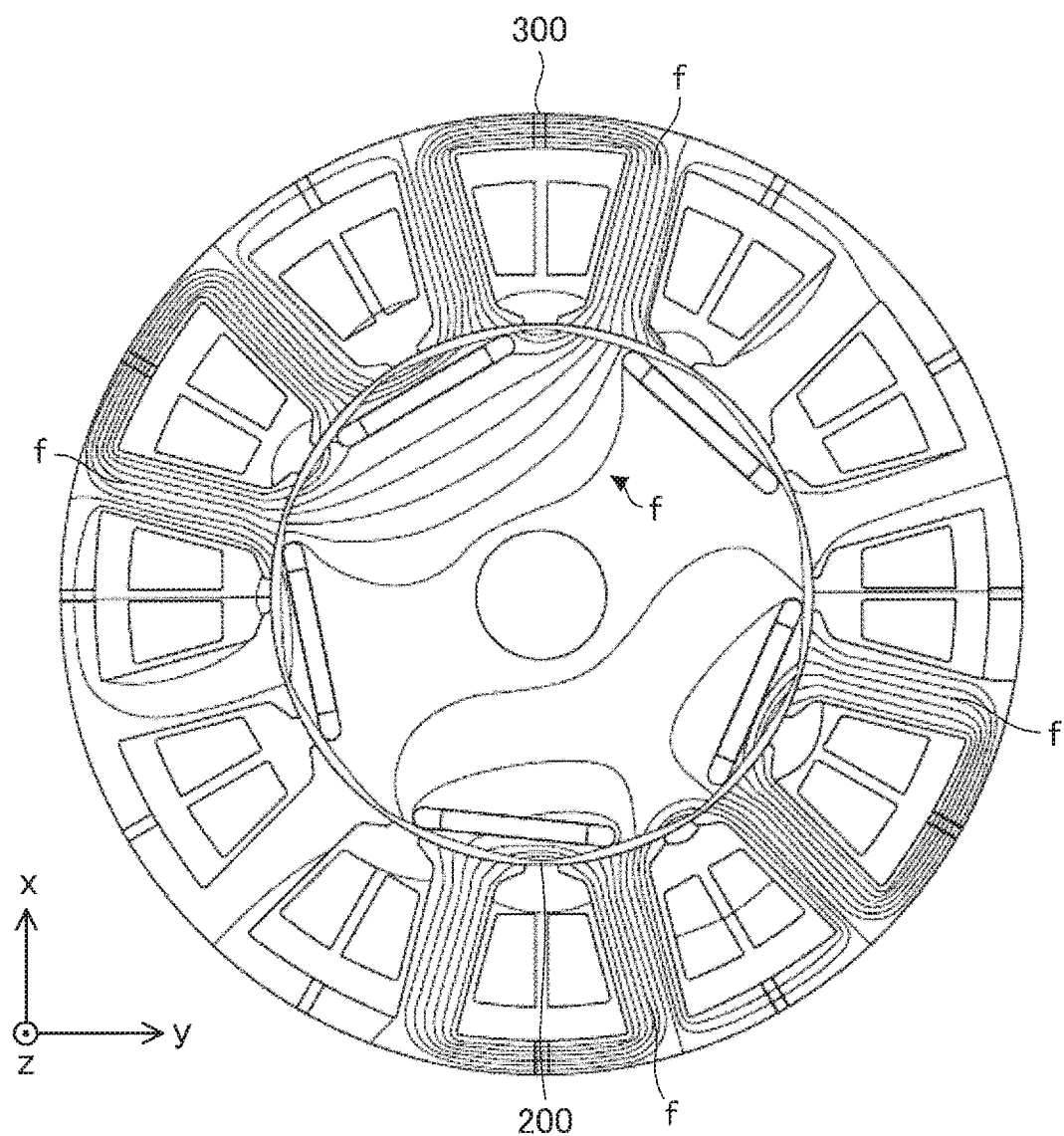
FIG. 6 is a diagram showing a flow of magnetic flux flowing from a stator into a rotor in a standard type of permanent magnet synchronous motor as a comparative example.

FIG. 6 is a diagram showing a flow of magnetic flux f flowing from a stator 300 into a rotor 200 in a standard type of permanent magnet synchronous motor as a comparative example.

As shown in FIG. 6, in a consequent-pole type rotor, magnetic flux f flowing into a second magnetic pole (corresponding to the second region R2 in this embodiment) is generally prone to pass through a first magnetic pole (corresponding to the first region R1 in this embodiment). Accordingly, noise tends to increase in an electric motor employing a consequent-pole type rotor.

Figure 7:
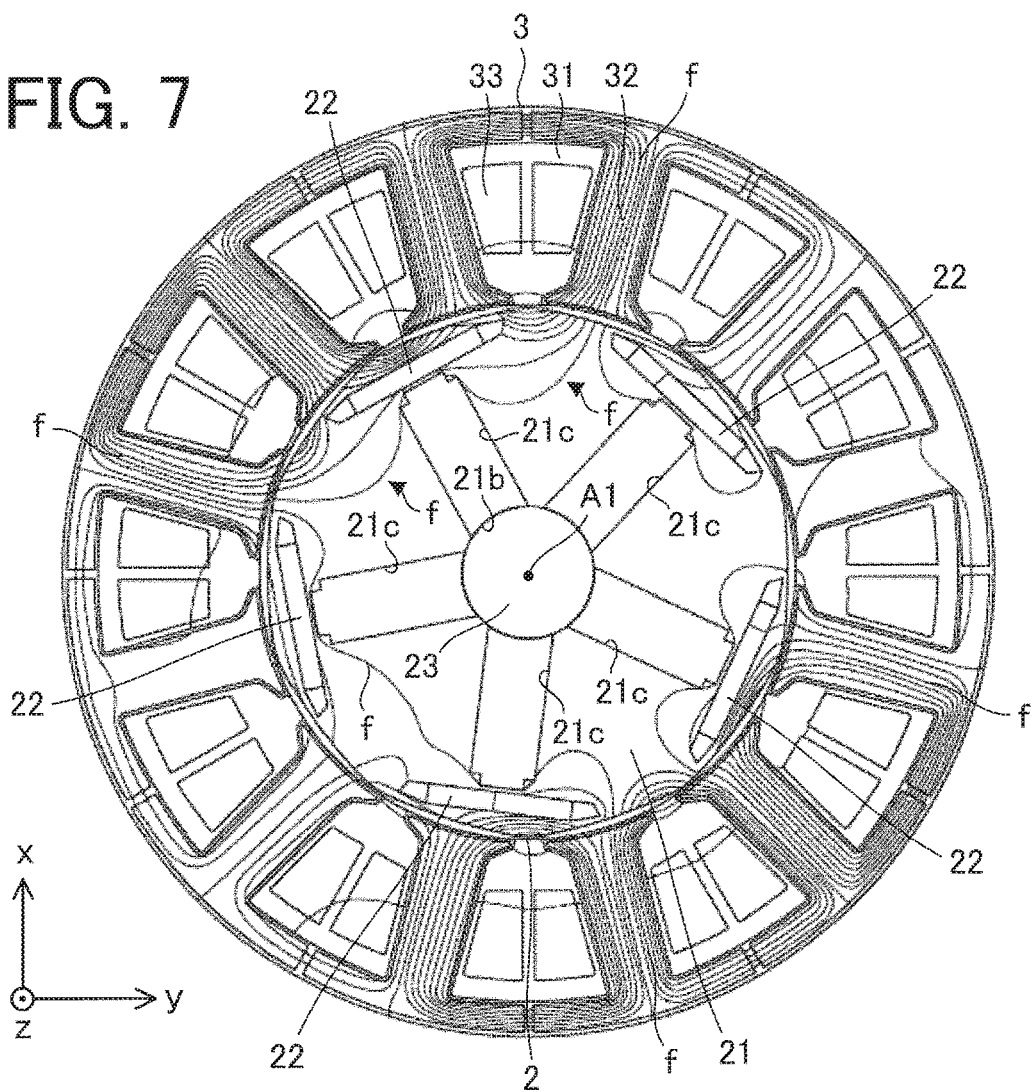
FIG. 7 is a diagram showing a flow of magnetic flux flowing from the stator into the rotor in the electric motor according to the first embodiment.

FIG. 7 is a diagram showing a flow of magnetic flux flowing from the stator 3 into the rotor 2 in the electric motor 1 according to this embodiment.

In this embodiment, the rotor 2 satisfies L1<L2. With this configuration, in the rotor 2 as a consequent-pole type rotor, the magnetic flux flowing from the stator 3 into the second region R2 can be prevented from passing through the first region R1. As a result, noise in the electric motor 1 employing the rotor 2 can be reduced.

As described above, by forming the rotor 2 to satisfy L1<L2, the increase in the noise can be prevented. Therefore, it is desirable to set the width L2 as great as possible. However, when the distance from the opening 21c to the magnet insertion hole 21a is too short, permeance of the permanent magnet 22 decreases and magnetic force of the permanent magnet 22 decreases. Thus, in this embodiment, the rotor 2 is formed so that the distance L3 is the smallest at the magnetic pole center c1 of the north pole. With this configuration, the decrease in the permeance of the permanent magnet 22 can be avoided and the decrease in the magnetic force of the permanent magnet 22 can be avoided. As a result, the decrease in the efficiency of the electric motor 1 (referred to also as "motor efficiency") can be prevented.

Further, by setting the width L1 as great as possible in the state in which the rotor 2 satisfies L1<L2, magnetic resistance of the opening 21c can be increased. Accordingly, the magnetic flux flowing from the stator 3 into the second region R2 can be prevented from passing through the first region R1 and the noise of the rotor 2 can be reduced. However, it is desirable to determine the width L1 of the opening 21c in consideration of the width T1 of the permanent magnet 22.

Figure 8:
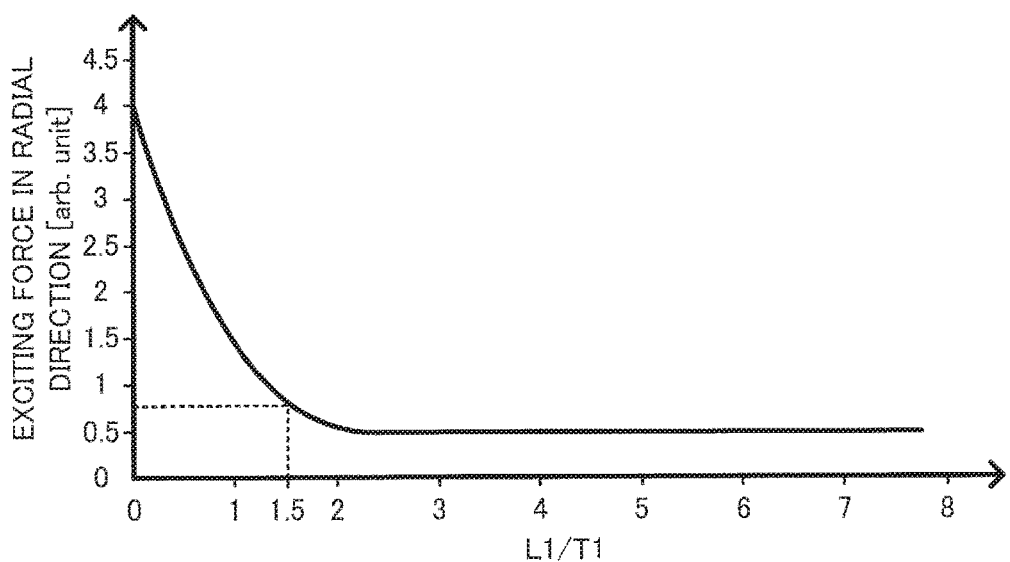
FIG. 8 is a diagram showing the relationship between a ratio L1/T1 and exciting force of the rotor.

FIG. 8 is a diagram showing the relationship between the ratio L1/T1 of the width L1 of the opening 21c to the width T1 of the magnet insertion hole 21a and exciting force of the rotor 2 in the radial direction.

As shown in FIG. 8, the exciting force decreases with the increase in the ratio L1/T1. The decrease in the exciting force is saturated when the ratio L1/T1 is greater than 1.5. Thus, the noise of the electric motor 1 can be reduced when the rotor 2 satisfies 1.5<L1/T1. On the other hand, when the width L1 of the opening 21c is greater than the width (maximum width) of the magnet insertion hole 21a in the direction perpendicular to the radial direction, the rigidity of the rotor core 21 drops. Therefore, the rotor 2 is desired to satisfy 1.5<L1/T1<7.5. With this configuration, the noise of the electric motor 1 can be reduced while maintaining sufficient rigidity of the rotor core 21.

Figure 9:
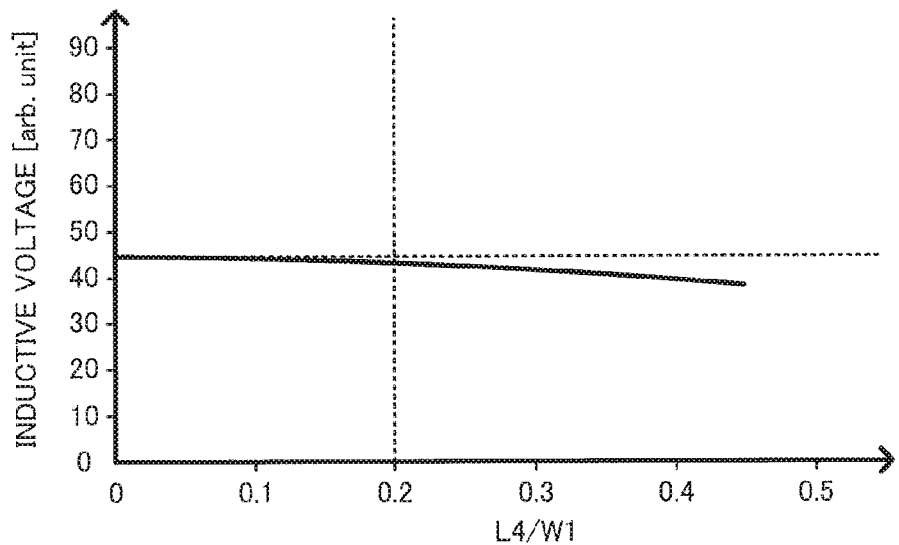
FIG. 9 is a diagram showing the relationship between a ratio L4/W1 and inductive voltage occurring during the rotation of the rotor.

FIG. 9 is a diagram showing the relationship between the ratio L4/W1 of the width L4 of the opening 21c to the width W1 of the permanent magnet 22 and inductive voltage occurring during the rotation of the rotor 2. The inductive voltage is proportional to the magnitude of the magnetic force of the permanent magnet 22. Thus, FIG. 9 shows the relationship (tendency) of the ratio L4/W1 and the magnitude of the magnetic force of the permanent magnet 22.

As shown in FIG. 9, the inductive voltage decreases with the increase in the ratio L4/W1 (i.e., with the increase in the width L4 relative to the width W1). Thus, with the increase in the width L4, the permeance of the permanent magnet 22 decreases and the magnetic force of the permanent magnet 22 decreases. In this embodiment, the inductive voltage decreases significantly when the ratio L4/W1 exceeds 0.2.

As shown in FIG. 9, the magnetic force of the permanent magnet 22 can be maintained more sufficiently as the ratio L4/W1 is closer to zero. Therefore, it is desirable to form the projecting part 21d in an arc-like shape.

In this embodiment, the rotor 2 satisfies 0<L4/W1<0.2 in the first region R1. With this configuration, the decrease in the magnetic force of the permanent magnet 22 can be prevented.

The electric motor 1 according to the first embodiment includes the rotor 2, and thus the electric motor 1 has the advantages described above.

Modification

Figure 10:
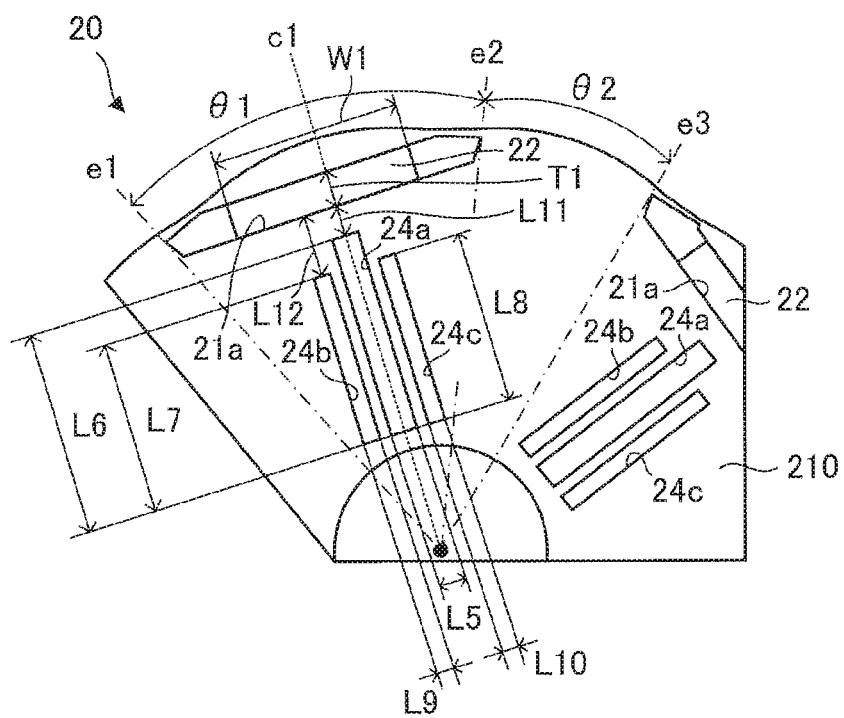
FIG. 10 is an enlarged view schematically showing a structure of a part of a rotor of an electric motor according to a modification.

FIG. 10 is an enlarged view schematically showing a structure of a part of a rotor 20 of an electric motor according to a modification. The part of the rotor 20 shown in FIG. 10 corresponds to the part of the rotor 2 shown in FIG. 5.

In the rotor 20, the structure of a rotor core 210 differs from that in the first embodiment. Specifically, in each first region R1, the rotor core 210 has a plurality of openings (specifically, openings 24a, 24b and 24c). The rest of the structure in the rotor 20 is the same as that in the rotor 2.

In the example shown in FIG. 10, in each first region R1, a plurality of openings, specifically, the opening 24a (first opening), the opening 24b (second opening) and the opening 24c (third opening) are formed in the rotor core 210. In each first region R1, the openings 24a, 24b and 24c are formed inside the magnet insertion hole 21a in the radial direction. Thus, each first region R1 is a region including a magnet insertion hole 21a and a plurality of openings (specifically, the openings 24a, 24b and 24c).

The opening 24a is formed in parallel with the magnetic pole center c1 on the xy plane. In other words, the opening 24a extends in the radial direction. The openings 24b and 24c are adjacent to the opening 24a. The openings 24a, 24b and 24c are in parallel with each other.

A width L6 (maximum width) of the opening 24a in the radial direction differs from a width L7 (maximum width) of the opening 24b in the radial direction and a width L8 (maximum width) of the opening 24c in the radial direction. In the example shown in FIG. 10, the width L6 is greater than the widths L7 and L8. That is, in the first region R1, the width L6 is the greatest among the widths in the radial direction. In the example shown in FIG. 10, the width L7 of the opening 24b and the width L8 of the opening 24c are the same as each other. However, the width L7 of the opening 24b and the width L8 of the opening 24c may also be set to differ from each other.

A width L5 (maximum width) of the opening 24a in the direction perpendicular to the radial direction differs from a width L9 (maximum width) of the opening 24b in the direction perpendicular to the radial direction and a width L10 (maximum width) of the opening 24c in the direction perpendicular to the radial direction. In the example shown in FIG. 10, the width L5 is greater than the widths L9 and L10. That is, in the first region R1, the width L5 is the greatest among the widths in the direction perpendicular to the radial direction. In the example shown in FIG. 10, the width L9 of the opening 24b and the width L10 of the opening 24c are the same as each other. However, the width L9 of the opening 24b and the width L10 of the opening 24c may also be set to differ from each other.

The width L6 is greater than the widths L5, L9 and L10. The width L7 is greater than the widths L5, L9 and L10.

The shortest distance L11 from the opening 24a to the magnet insertion hole 21a and the shortest distance L12 from the opening 24b to the magnet insertion hole 21a differ from each other. Specifically, the shortest distance L11 is shorter than the shortest distance L12. In the example shown in FIG. 10, the shortest distance L12 from the opening 24b to the magnet insertion hole 21a and the shortest distance from the opening 24c to the magnet insertion hole 21a are the same as each other. Thus, the shortest distance L11 is the shortest among the distances from the openings 24a, 24b and 24c to the magnet insertion hole 21a. However, the shortest distance L12 from the opening 24b to the magnet insertion hole 21a and the shortest distance from the opening 24c to the magnet insertion hole 21a may also be set to differ from each other. The shortest distances L11 and L12 are desired to be greater than the thickness of the electromagnetic steel sheet used for forming the rotor core 210, for example.

The relationship between the sum S1 of the maximum widths of the plurality of openings (openings 24a, 24b and 24c in FIG. 10) in the direction perpendicular to the radial direction and the width T1 of the magnet insertion hole 21a satisfy 1.5<S1/T1. The sum S1 of the maximum widths is the sum of the maximum width of the opening 24a in the direction perpendicular to the radial direction (the width L5 in FIG. 10), the maximum width of the opening 24b in the direction perpendicular to the radial direction (the width L9 in FIG. 10), and the maximum width of the opening 24c in the direction perpendicular to the radial direction (the width L10 in FIG. 10).

Advantages of the rotor 20 of the electric motor according to the modification will be described below.

In a consequent-pole type rotor, when the opening 21c is formed in the rotor core 21 as shown in FIG. 4 and FIG. 5, for example, the magnetic flux flowing from the stator 3 into the second region R2 can be prevented from passing through the first region R1. As a result, the noise in the rotor 2 can be reduced.

However, in the case where each first region R1 has only one opening 21c, it is not easy to adjust the volume of the opening 21c. For example, when the shaft 23 is fixed in the rotary shaft insertion hole 21b by injecting resin into the rotary shaft insertion hole 21b, there are cases where the resin flows also into the opening 21c. In such cases, the structure of the rotor 2 becomes imbalanced when the opening 21c is not uniformly filled in with the resin. As a result, there are cases where the noise of the electric motor 1 is not reduced sufficiently.

In this modification, a plurality of openings (i.e., openings 24a, 24b and 24c) are formed in each first region R1. Accordingly, when the openings 24a, 24b and 24c are formed in the rotor core 210, the adjustment of the volume of the openings in the first region R1 becomes easy. Thus, when the shaft 23 is fixed in the rotary shaft insertion hole 21b by injecting resin into the rotary shaft insertion hole 21b, for example, the openings 24a, 24b and 24c can be uniformly filled in with the resin. Accordingly, appropriate balance of the structure of the rotor 20 can be obtained and the same advantages as those described in the first embodiment (e.g., decrease in the noise of the electric motor 1) can be obtained.

In the rotor 20, the shortest distance L11 is shorter than the shortest distance L12. Namely, the shortest distance L11 is the shortest among the distances from the openings 24a, 24b and 24c to the magnet insertion hole 21a. Therefore, the overall shape of the plurality of openings (specifically, the openings 24a, 24b and 24c) in the first region R1 is formed so that a central part in the direction perpendicular to the radial direction projects outward in the radial direction similarly to the opening 21c described in the first embodiment. With this configuration, the magnetic flux flowing from the stator 3 into the second region R2 can be prevented from passing through the first region R1. Consequently, the decrease in the magnetic force of the permanent magnet 22 can be prevented and the noise in the electric motor including the rotor 20 can be reduced.

The relationship between the ratio S1/T1 and the exciting force of the rotor 2 in the radial direction is the same as the relationship (tendency) shown in FIG. 8. Namely, when the rotor 20 satisfies 1.5<S1/T1, the decrease in the exciting force of the rotor 20 is saturated similarly to the first embodiment. Thus, the noise of the electric motor 1 can be reduced when the rotor 20 satisfies 1.5<S1/T1. Further, the rotor 20 is desired to satisfy 1.5<S1/T1<7.5. With this configuration, the noise of the electric motor according to the modification can be reduced while sufficient rigidity of the rotor core 210 is maintained.

The electric motor according to the modification includes the rotor 20, and thus the electric motor according to the modification has the advantages described above.

Second Embodiment

An air conditioner 50 according to a second embodiment of the present invention will be described below.

Figure 11:
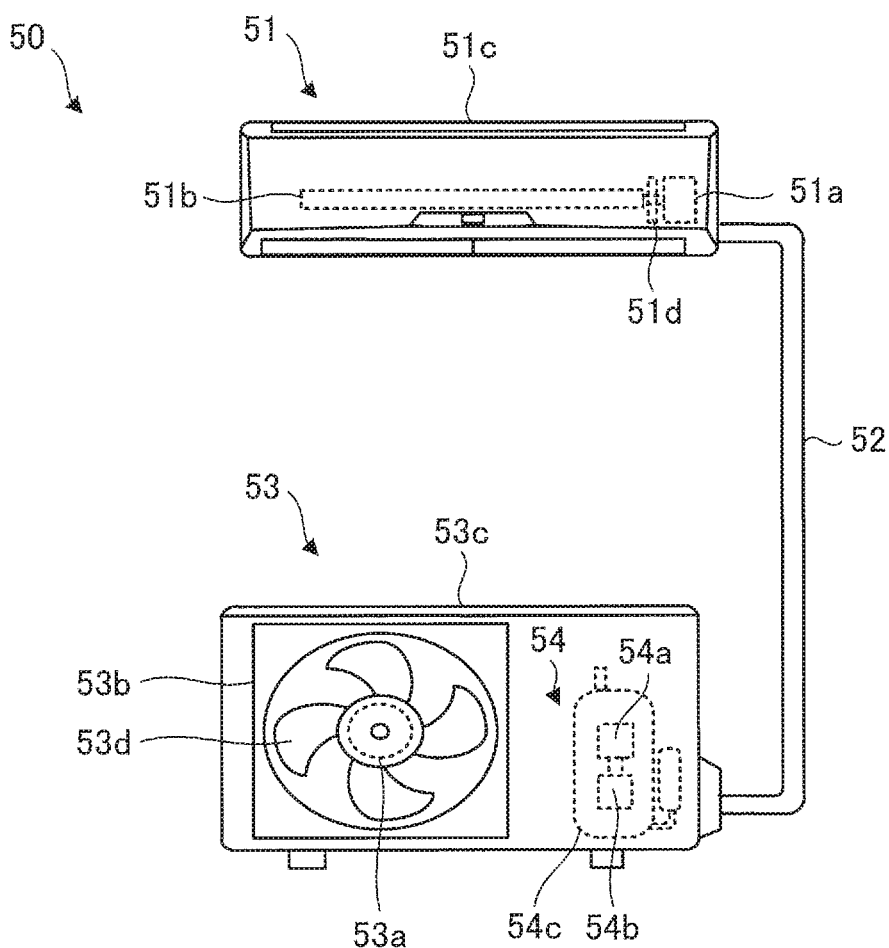
FIG. 11 is a diagram schematically showing a configuration of an air conditioner according to a second embodiment of the present invention.

FIG. 11 is a diagram schematically showing a configuration of the air conditioner 50 according to the second embodiment of the present invention.

The air conditioner 50 (e.g., refrigeration air conditioner) according to the second embodiment includes an indoor unit 51 as a blower (first blower), refrigerant piping 52, and an outdoor unit 53 as a blower (second blower) connected to the indoor unit 51 by the refrigerant piping 52.

The indoor unit 51 includes an electric motor 51a (e.g., the electric motor 1 according to the first embodiment), a blower unit 51b that is driven by the electric motor 51a and thereby blows out air, and a housing 51c that covers the electric motor 51a and the blower unit 51b. The blower unit 51b includes, for example, a blade 51d driven by the electric motor 51a. For example, the blade 51d is fixed to a shaft of the electric motor 51a (e.g., the shaft 23) and generates an air current.

The outdoor unit 53 includes an electric motor 53a (e.g., the electric motor 1 according to the first embodiment), a blower unit 53b, a compressor 54, and a heat exchanger (not shown). The blower unit 53b is driven by the electric motor 53a and thereby blows out air. The blower unit 53b includes, for example, a blade 53d driven by the electric motor 53a. For example, the blade 53d is fixed to a shaft of the electric motor 53a (e.g., the shaft 23) and generates an air current. The compressor 54 includes an electric motor 54a (e.g., the electric motor 1 according to the first embodiment), a compression mechanism 54b (e.g., refrigerant circuit) driven by the electric motor 54a, and a housing 54c that covers the electric motor 54a and the compression mechanism 54b.

In the air conditioner 50, at least one of the indoor unit 51 or the outdoor unit 53 includes the electric motor 1 described in the first embodiment (including the modification). Specifically, the electric motor 1 described in the first embodiment is employed for at least one of the electric motor 51a or the electric motor 53a as a drive source for the blower unit. Further, it is also possible to employ the electric motor 1 described in the first embodiment (including the modification) as the electric motor 54a of the compressor 54.

The air conditioner 50 is capable of performing a cooling operation of blowing out cool air from the indoor unit 51, a heating operation of blowing out warm air, or the like, for example. In the indoor unit 51, the electric motor 51a is a drive source for driving the blower unit 51b. The blower unit 51b is capable of blowing out conditioned air.

With the air conditioner 50 according to the second embodiment, the same advantages as those described in the first embodiment can be obtained since the electric motor 1 described in the first embodiment (including the modification) is employed for at least one of the electric motor 51a or the electric motor 53a. Accordingly, noise of the air conditioner 50 can be reduced.

Further, by using the electric motor 1 according to the first embodiment (including the modification) as the drive source of a blower (e.g., the indoor unit 51), the same advantages as those described in the first embodiment can be obtained. Accordingly, noise of the blower can be reduced. A blower including the electric motor 1 according to the first embodiment and a blade (e.g., the blade 51d or 53d) driven by the electric motor 1 can be used independently as a device for blowing out air. This blower can be employed also for equipment other than the air conditioner 50.

Furthermore, by using the electric motor 1 according to the first embodiment (including the modification) as the drive source of the compressor 54, the same advantages as those described in the first embodiment can be obtained. Accordingly, noise of the compressor 54 can be reduced.

The electric motor 1 described in the first embodiment can be mounted not only on the air conditioner 50 but also on equipment having a drive source, such as a ventilating fan, a household electrical appliance and a machine tool.

Features in the embodiments (including the modification) described above can be appropriately combined with each other.

What is claimed is:

1. A consequent-pole type rotor including a first magnetic pole and a second magnetic pole, comprising:
   a rotor core including a magnet insertion hole and an opening, the opening being located apart from, and radially inward from, the magnet insertion hole; and
   a permanent magnet inserted in the magnet insertion hole and forming the first magnetic pole,
   wherein the consequent-pole type rotor satisfies L1<L2, where L1 is a first maximum width of the opening in a direction perpendicular to the radial direction and L2 is a second maximum width of the opening in the radial direction, and
   wherein a distance from the opening to the magnet insertion hole is smallest at a magnetic pole center of the first magnetic pole.

2. The consequent-pole type rotor according to claim 1, wherein the consequent-pole type rotor satisfies 1.5<L1/T1, where L1 is the first maximum width and T1 is a width of the magnet insertion hole in the radial direction.

3. The consequent-pole type rotor according to claim 2, wherein the consequent-pole type rotor satisfies L1/T1<7.5.

4. The consequent-pole type rotor according to claim 1, wherein the consequent-pole type rotor satisfies 0<L4/W1<0.2, where:
   L4 is a width of an outer end part of the opening in the radial direction, L4 being the width measured in the direction perpendicular to the radial direction, and
   W1 is a width of the permanent magnet in the direction perpendicular to the radial direction.

5. A consequent-pole type rotor including a first magnetic pole and a second magnetic pole, comprising:
   a rotor core including a magnet insertion hole and a plurality of openings, the plurality of openings being located apart from, and radially inward from, the magnet insertion hole; and
   a permanent magnet inserted in the magnet insertion hole,
   wherein the rotor core is divided into a first region and a second region adjacent to the first region, the first region including the magnet insertion hole and the plurality of openings and forming the first magnetic pole, the second region forming the second magnetic pole,
   wherein the plurality of openings are formed in the first region,
   wherein in a plane perpendicular to an axial direction, a first opening of the plurality of openings is located at a central part in a direction perpendicular to the radial direction among the plurality of openings,
   wherein a shortest distance from the first opening of the plurality of openings to the magnet insertion hole and a shortest distance from a second opening of the plurality of openings to the magnet insertion hole are different from each other,
   wherein a maximum width of the first opening in the radial direction is greater than a maximum width of the first opening in a direction perpendicular to the radial direction, and
   wherein the shortest distance from the first opening to the magnet insertion hole is the shortest among distances from the plurality of openings to the magnet insertion hole.

6. The consequent-pole type rotor according to claim 5, wherein the maximum width of the first opening in the radial direction is greater than a maximum width of the second opening in the direction perpendicular to the radial direction.

7. The consequent-pole type rotor according to claim 5, wherein the maximum width of the first opening in the radial direction is greater than a maximum width of the second opening in the radial direction.

8. The consequent-pole type rotor according to claim 5, wherein the consequent-pole type rotor satisfies 1.5<S1/T1, where S1 is a sum of maximum widths of the plurality of openings in the direction perpendicular to the radial direction and T1 is a width of the magnet insertion hole in the radial direction.

9. The consequent-pole type rotor according to claim 8, wherein the consequent-pole type rotor satisfies S1/T1<7.5.

10. An electric motor comprising:
a stator; and
the consequent-pole type rotor according to claim 1.

11. An electric motor comprising:
a stator; and
the consequent-pole type rotor according to claim 5.

12. A compressor comprising:
an electric motor; and
a compression mechanism driven by the electric motor,
wherein the electric motor includes:
    a stator; and
    the consequent-pole type rotor according to claim 1.

13. A compressor comprising:
an electric motor; and
a compression mechanism driven by the electric motor,
wherein the electric motor includes:
    a stator; and
    the consequent-pole type rotor according to claim 5.

14. A blower comprising:
an electric motor; and
a blade driven by the electric motor,
wherein the electric motor includes:
    a stator; and
    the consequent-pole type rotor according to claim 1.

15. A blower comprising:
an electric motor; and
a blade driven by the electric motor,
wherein the electric motor includes:
    a stator; and
    the consequent-pole type rotor according to claim 5.

16. An air conditioner comprising:
an indoor unit; and
an outdoor unit connected to the indoor unit,
wherein at least one of the indoor unit or the outdoor unit includes an electric motor, the electric motor including:
    a stator; and
    the consequent-pole type rotor according to claim 1.

17. An air conditioner comprising:
an indoor unit; and
an outdoor unit connected to the indoor unit,
wherein at least one of the indoor unit or the outdoor unit includes an electric motor, the electric motor including:
    a stator; and
    the consequent-pole type rotor according to claim 5.

18. The consequent-pole type rotor according to claim 5, wherein the consequent-pole type rotor satisfies $(\theta 1+\theta 2)\times n/2=360$ degrees, where:
a first straight line and a second straight line are two straight lines defining the first region on the plane perpendicular to the axial direction,
the second straight line and a third straight line are two straight lines defining the second region on the plane,
$\theta 1$ is an angle formed by the first straight line and the second straight line on the plane,
$\theta 2$ is an angle formed by the second straight line and the third straight line on the plane, and
n (n is an even number greater than or equal to 4) is a total number of the first and second regions.

* * * * *